United States Patent [19]

Karagoz

[11] 4,394,766
[45] Jul. 19, 1983

[54] GRAPHITIZATION SYSTEM METHOD AND APPARATUS

[75] Inventor: Berch Y. Karagoz, Grand Island, N.Y.

[73] Assignee: Great Lakes Carbon Corporation, New York, N.Y.

[21] Appl. No.: 289,249

[22] Filed: Aug. 3, 1981

[51] Int. Cl.³ .......................... H05B 3/60; F27D 3/00
[52] U.S. Cl. .................................... 373/120; 373/115; 373/122
[58] Field of Search ............... 373/115, 120, 122, 117, 373/125, 111, 129

[56] References Cited

U.S. PATENT DOCUMENTS

| 1,107,478 | 8/1914 | Bayard | 373/115 |
| 1,198,616 | 9/1916 | Brown | 373/129 |
| 4,015,068 | 3/1977 | Vohler | 373/120 |
| 4,017,673 | 4/1977 | Michels et al. | 373/120 |

FOREIGN PATENT DOCUMENTS

| 47-3442 | 1/1972 | Japan. |
| 54034/70 | 6/1974 | Japan. |
| 1290276 | 9/1972 | United Kingdom. |

Primary Examiner—Roy N. Envall, Jr.
Attorney, Agent, or Firm—Adrian J. Good

[57] ABSTRACT

Amorphous carbon bodies forming a lengthwise series horizontal string or column 26 are converted to graphite by the Joule effect in a semi-cylindrical metal shell 20 with a refractory lining 22 and containing particulate thermal insulation medium 28. When the conversion to graphite is complete the insulation medium is dumped through the bottom of the metal shell into a hopper 50 and transferred for re-use while hot. Air pollution control is facilitated and energy and capital costs are lowered by specialization of equipment, retention of sensible heat and shorter cycle times, allowing operation with less equipment and higher production rates.

23 Claims, 11 Drawing Figures

GRAPHITIZATION SYSTEM METHOD AND APPARATUS

DESCRIPTION

BACKGROUND OF THE INVENTION

1. Field of the Invention

This invention relates to a method and apparatus for carrying out the production of graphite electrodes and other graphitized bodies.

A great variety of electrochemical and metallurgical processes are carried out with the use of carbon and graphite electrodes. In this context it should be understood that the word carbon denotes the amorphous form of carbon and graphite denotes the multilayered hexagonal crystalline form of carbon.

Carbon and graphite electrodes are used in many electrochemical processes, including the production of magnesium, chlorine, iodine, phosphorus, steel, and the production of aluminum in Hall cells.

Carbon electrodes consist of the essentially amorphous carbon from petroleum coke which has been calcined, ground, classified by size, mixed with a binder, and bound in a matrix of amorphous carbon derived from the binder after baking at temperatures of approximately 700° to 1100° C. in a baking furnace. Graphite electrodes are produced from the carbon forms by placing them in an Acheson furnace and in recent years in a Lengthwise Graphitization (LWG) type furnace and heating them to a temperature between 2500° to 3000° C., which converts the amorphous form of carbon to the crystalline graphite, and vaporizes most of the impurities present in the original carbon, including most metals and sulfur compounds.

Graphite, compared to amorphous carbon, has much higher electrical and thermal conductivity, lower coefficient of thermal expansion (CTE), superior ductility and vastly superior thermal shock resistance at the operating temperatures of the electric arc steel furnace. These physical properties are uniquely valuable in the electric furnace, with its need for high electrical currents, and the need to resist the mechanical and thermal shock suffered by the electrodes from the falling scrap, fluctuations in metal and electrode level, and generally high thermal stresses. Consequently, graphite is universally used as an electrode in the electric arc melting of steel.

The production of graphite electrodes from the so-called carbon electrodes has traditionally been carried out in the Acheson furnace in which the electrodes are typically placed in a transverse orientation to the flow of the electrical current, and surrounded by a resistor medium, thereby causing the current to pass alternately through tiers of electrodes and resistor media, the latter being typically metallurgical or petroleum coke. The Acheson process is of such ancient vintage and so well known as not to require any further description. The LWG process, although also very old, is less well known and has been practiced on a commercial scale only in recent years. The LWG process is carried out by arranging the carbon electrodes in a continuous column with an electrical connection at each end of the column. See U.S. Pat. No. 1,029,121 Heroult, Cl. 13/7, June 11, 1912 and U.S. Pat. No. 4,015,068, Vohler, Mar. 29, 1977 Cl. 13/7. In the LWG process, the electrodes themselves form the dominant path for the heating current, with one or both of the ends of the column subjected to a mechanical or hydrostatic pressure source in order to keep the connection tight under expansion or contraction of the column during the heating cycle. Vohler does not use a packing medium, but discloses a metal shell with a felt liner as insulation.

The LWG process has many advantages over the Acheson process. The energy efficiency is much higher, as the material is heated directly instead of indirectly, and the cycle time for the process is much faster taking typically less than 12 hours as compared to 60 to 120 hours for the Acheson process.

SUMMARY OF THE INVENTION

One of the persistent problems encountered in the graphitization process has been the handling of the hot stock and packing medium. In the Acheson process the packing medium between the electrodes is also the conducting medium and must be well packed and then removed during the unloading step. In industry this has been handled by mechanical loaders and unloaders such as clam shell buckets and front end loaders.

The LWG process uses the packing medium primarily as heat insulation in contrast to the Acheson process. Its handling has also been a problem and has been done in the past with mechanical loaders, either clam shell or pneumatic suction devices. The hot medium typically must be removed from the furnace, transported to another location, cooled, rescreened and resized for reuse. This process has proved to be one of the more time consuming and troublesome aspects of the LWG process as well as a source of severe air pollution with the clam bucket type operation.

My invention is a process and apparatus for production of graphite articles, particularly large electrodes, by the LWG process, and comprises a U shaped open top furnace shell fabricated from metal with a cast-in-refractory lining. The furnace is composed of several shell modules with each module electrically isolated to localize any electrical leakage to the shell. Each section is also suspended by a system of flexible or sliding support brackets to allow for differential thermal expansion between the anchored center and the free ends of each section. The joints between the furnace sections termed as the expansion joint can be of various designs, preferably a refractory lined U-shaped metal insert positioned in the contoured nests of adjacent section ends to contain the packing medium, allow for expansion, and serve as electrical isolation gaps. The apparatus is well adapted for handling the packing medium by gravity unloading of the medium from the shell enclosing the medium and column, by means of suitable valves or slide gates incorporated at openings or dump ports located at the bottom of the furnace shells, into storage bins or hoppers located beneath the dump ports, all of which are in continuous connection or association with one another and well suited to rapidly and easily facilitate handling of the medium for reuse. By this means the labor and energy involved in handling the medium and the possibility of damage to the furnace and to the electrodes are minimized. Time is also saved, the heat energy in the medium may be transferred and conserved, and the problems with gaseous and particulate emissions are minimized.

The LWG furnace is well suited to a movable arrangement by means of wheels travelling on tracks from station to station or by means of an independent vehicle called a transporter to move the furnace from station to station. By this movable furnace arrangement, each unit operation such as loading, firing, cooling and unloading can be carried out in separate stations thus enhancing the control of particulate and gaseous emissions, greatly reducing labor as well as reducing the possibility of damage to the furnace.

Gravity unloading of the packing medium can also be carried out in a stationary or non-movable furnace arrangement where the storage bins or hoppers are in a movable arrangement thus moving beneath the dump ports for the unloading of the medium and moved out for the packing or reloading of the same furnace or another furnace.

A third scheme with the gravity unloading furnace can utilize a conveyor arrangement beneath the dump ports to remove the medium and convey to a central point for reloading of bins for reuse.

The installation and operation of an LWG apparatus using a metal shell also presents the problem of thermal expansion of the shell. The longitudinal expansion is accomodated by a system of sliding support brackets between sections in the shell, and by flexible support members allowing lateral movement at the ends of each section.

The apparatus of the invention preferably uses DC from a rectiformer as the energy source. Each section of the shell is electrically isolated from the adjoining sections and from the structural framework, in order to localize any electrical short to the shell through the packing medium and the shell insulation. By this means, if an electrically weak spot develops in the insulating refractory allowing current to leak from the electrode column, the leak is isolated and does not short out the entire furnace.

The apparatus as actually used is comprised of two of the U-shaped furnaces side-by-side in the supporting structure, making a horizontal U-shaped path for the current. The power heads at the end of the furnace nearest the rectiformer are of positive and negative polarity with a shunt at the opposite end and carry the total current load through the furnace.

In producing graphite electrodes in the apparatus of the invention, a number of the shaped baked carbon bodies are laid end-to-end placed in a bed of particulate insulation medium, forming a horizontally placed column between the two power heads. This is preferably accomplished by use of the apparatus shown herein in FIGS. 8 and 9 and further described in my co-pending application Ser. No. 315,161, filed Oct. 26, 1981.

The movable furnace arrangement is a distinct break with past graphitization practice. The electrodes are fired in the furnace at a firing station, then when power is cut off, the furnace is moved to a separate cooling area, then to a dump and re-load station. As soon as the power is cut off and the furnace moved to the cooling area, another loaded furnace is placed in the firing station and power applied.

The specific advantages found in this arrangement of the apparatus include a lower capital cost due to the use of one firing station serving a plurality of furnaces instead of only one as in current practice. In particular, a simpler electrical bus system is used giving considerable savings in capital and operating expenses. Each station, the firing, cooling, and dump and re-load, is equipped with the necessary air pollution control equipment for that operation. By concentrating each function in one area, capital and operating costs are lowered, and in particular, control of air pollution is facilitated.

Further advantages are found in the better mechanization of the total process, in effect using an assembly line concept for faster turnaround time, lower labor costs, and less exposure of the operators to heat and air pollutants. The metal shell and refractory liner are not designed to hold heat, rather to conduct and dissipate it while isolating the furnace electrically. When firing the furnace, the heat lost by the electrodes is slowly conducted away by the insulation medium. The shell and liner remain relatively cool because of the thickness of the insulation with the resultant low total heat conductivity. In typical practice the peak of the heat wave will only reach the refractory liner several hours after the electrodes are graphitized and the electrical power is cut off. After a predeterminal cooling period, the electrodes are removed from the furnace by means of a stock extractor. After the electrodes are removed and the medium dumped into the hoppers, the high thermal conductivity of the refractory liner and shell allow it to cool down relatively quickly, principally by radiation, to alleviate problems due to high temperatures.

The use of a steel shell makes the movable construction and bottom dump features possible, and is a key element in the total invention.

When firing is finished and power disconnected, a transporter car equipped with lifting devices is moved into place under the furnace, it is raised off the piers, and moved to the cooling station. After cooling the electrodes to about 1500° to 1700° C., the furnace is moved to the dump and reload station and a chute car placed under the furnace in alignment with the dump gates over the hoppers. The medium is dumped, the electrodes removed, the furnace partially filled with insulation medium, and a fresh column of pre-baked electrodes is placed in the furnace. A hopper of insulating medium is discharged into the furnace, covering the column, and the furnace is then moved to the firing station. After the furnace is removed from the dump and re-load station, the filled hoppers may be removed by crane to a storage area and empty hoppers placed in position for the next furnace dump, or the same hot medium may be immediately re-used.

The particulate insulation is described as a sized grade of calcined petroleum coke fines recovered from the settling chamber of a rotary kiln calcining installation. When raw petroleum coke is calcined at temperatures of about 1200° to 1400° C. to remove volatiles and convert the physical structure to the harder and denser calcined coke, a small fraction is degraded to particulate matter which is too fine for use as is and has, in the past, been burned or allowed to dissipate into the atmosphere as particulates. Recovery of this fraction is now mandated for abatement of air pollution and economics. Other grades of particulate insulation such as crushed baked scrap may also be used, or metallurgical coke made from coal.

DESCRIPTION OF THE PREFERRED EMBODIMENT

The residual particulate media in a recently unloaded graphitizing furnace is leveled and compacted by a vibratory device to form a firm bed for the electrode column. The vibratory device may be a plate or tongs connected to a vibrator and inserted into the insulation bed.

The column of baked carbon electrodes is next positioned in the furnace on the partially filled bed of insulation medium and aligned with the head electrodes positioned at each end of the furnace. The furnace may still be quite hot, on the order of several hundred degrees Celsius. Pressure is applied to the ends by the hydraulic cylinders and the remainder of the charge of the insulation medium is then dumped into the furnace from the overhead hoppers, with a "pants-leg" or inverted Y-shaped chute directing the flow of medium along both sides of the column.

During loading of the insulation medium, each layer is vibratorily compacted to insure that the column is firmly supported against vertical and lateral movement. An uncompacted layer of insulation is then placed over the column. This completes the furnace loading stage.

The furnace is next transported to the firing station by a transporter means. Hydrostatic pressure of about $1.7 \times 10^5$ Pa (25 P.S.I.) is maintained by the use of a self-contained hydraulic system including pumps and controls.

At the firing station the power head electrodes are connected to the current source and the hydraulic pressure on the electrodes is increased typically from about $1.7 \times 10^5$ Pa (25 P.S.I.) to a $6.9 \times 10^6$ Pa (200 P.S.I.). The pressure used on the electrode column will vary with column length, longer columns requiring higher pressure, and whether one or both electrical power heads are hydraulically powered.

The current is applied, heating the column of electrodes rapidly by the Joule effect to the required graphitization temperature, usually from 2400°–2800° C., sometimes as high as 3000° C., taking approximately 4 to 12 hours, until the graphitization process is completed. The power is turned off, the furnace moved to a cooling station and the electrodes allowed to cool. When the electrodes have reached approximately 1500° C.–1700° C., the furnace is moved to the dump and re-load station and the transporter is replaced by a chute car with ducts leading from the dumping gates to the hoppers below. The electrodes are unloaded by a grab (stock extractor), the insulation medium is dumped at a weighted average temperature of from 700° to 1100° C. into the hoppers, and the furnace loaded with another electrode string and insulation charge. The chute car is removed and the furnace is transported back to the firing station.

After dumping the insulation medium to the hoppers, and removal of the hoppers, the hoppers may be moved by crane to storage. It is preferable to recycle the hot medium, which has a temperature in the range of approximately 600° to 1100° C., immediately for re-use, retaining its heat and thereby conserving electrical energy. It had previously been standard practice in the industry to cool and re-screen insulation media between graphitization runs; however, I have found that this is not necessary.

I have also found that air pollution is lowered when transferring the medium while hot. The finer mesh particles which would normally be air-borne are oxidized during the hot dumping step rather than dispersed, and the amount of CO and $SO_2$ evolved is minimal.

When transferring the insulating medium, the retained heat also enables me to bring the next electrode string to its conversion temperature quicker, effectively saving both operating and capital expenses by producing more electrodes in the same time period with lower power requirements. I have found that the hot handling of the medium results in a small percentage loss of the medium to combustion and to the dust collector, typically 5% or less per furnace cycle.

When transferring the hot medium, the hopper may be used as the sole vessel for the dump and recharging operation or the medium may be transferred to a separate bin for re-charging the next furnace.

DESCRIPTION OF THE DRAWINGS

Figure 1:
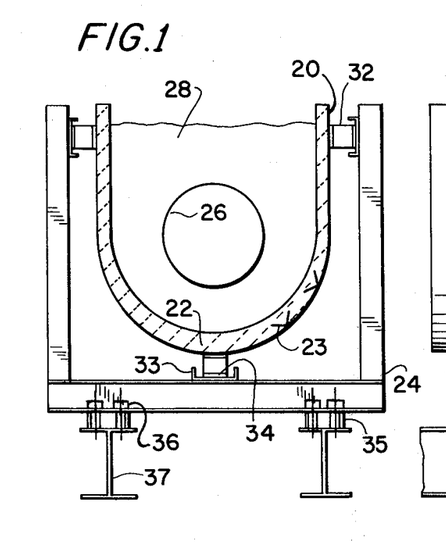

FIG. 1 is a cross-sectional view of the LWG furnace. The steel shell 20 is insulated with refractory liner 22, preferably a high alumina cast-in-place refractory with anchors 23, although a masonry type may also be used. Framework 24 supports the furnace by elastic brackets 32, which are plates or I-beam sections welded to the shell 20 and framework 24, the web of the bracket being flexible to accomodate differential thermal expansion of the shell between adjacent brackets. The outer two vertical members of the framework 24 are elastic in the longitudinal direction to allow movement of the ends of the shell segments caused by thermal expansion. Bottom support brackets 34 are sliding I-beam sections welded to the shell and sliding on plates 33 to allow for axial movement and an arrangement of isolation pads 35 and anchoring brackets 36 is utilized to secure each individual furnace shell section to the subframe 37 while isolating the shell from ground. The column of electrodes 26 is embedded in the insulating medium 28.

Figure 2:
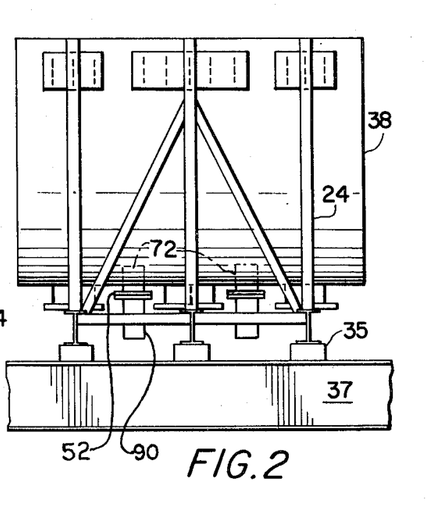

FIG. 2 is a side elevation of a LWG furnace shell assembly 38 showing the isolation pads 35, the shell support frame 24, dumping ports 72 equipped with shut-off gates 52 and discharge pipes 90 (both shown in FIG. 6), and substructure 37.

Figure 3:
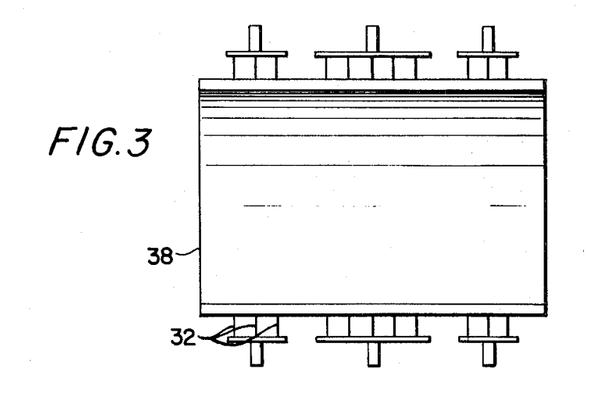

FIG. 3 is a top view of an LWG furnace shell assembly 38 showing steel shell 20 and elastic supports 32.

Figure 4:
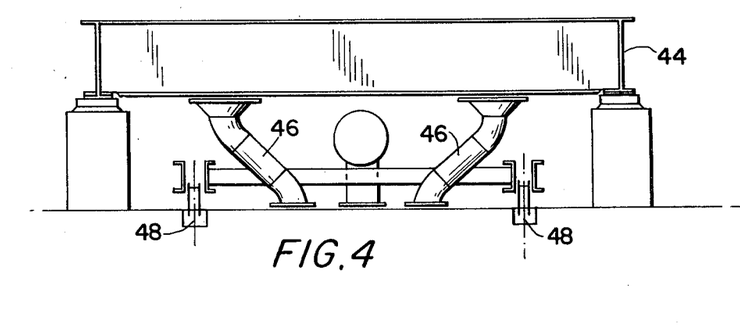

FIG. 4 is a cross-sectional view of the chute car 44 with 2 sets of chutes 46, one set leading from each leg of the furnace to the center. During operation, after the furnace is brought to the dump and re-load station, the transporter car is removed and the chute car 44 is moved on rails 48 under the furnace so that the chutes 46 are aligned with the discharge pipes 90 of the shell assembly and the hoppers 50 below. The hot insulation medium is then dumped into the hoppers.

Figure 5:
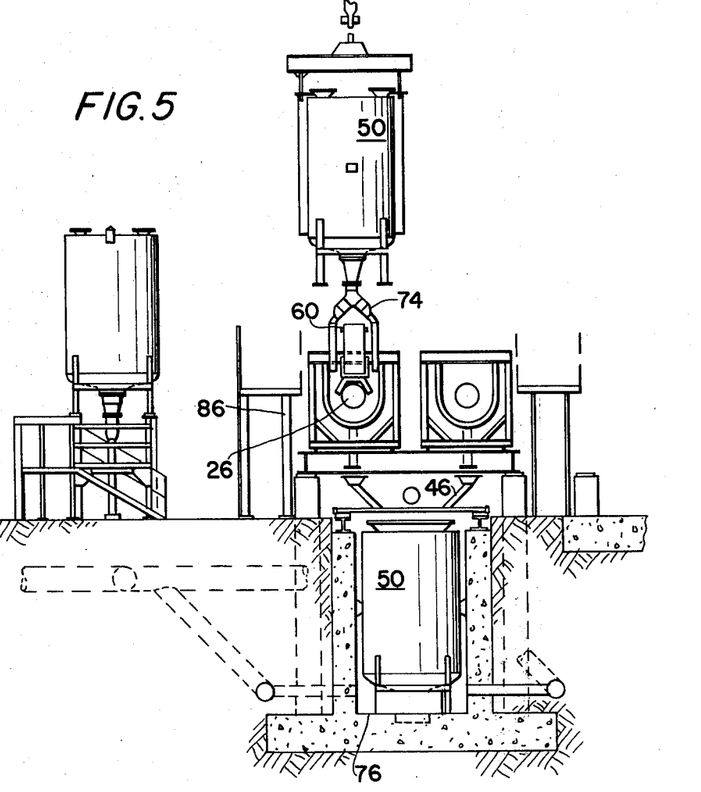

FIG. 5 shows a reloading operation with a hopper 50 above the furnace, a reloading pantleg chute 74 over the electrode column 26 held in stock loading truss 60 (described in more detail in my co-pending application Ser. No. 315,161 filed Oct. 26, 1981). With the pantleg chute it is possible to load the insulation medium uniformly along both sides of the electrode string. It also shows the chute car 44 with chutes 46 in place over the hopper 50 in the hopper pit 76. The hopper may also be insulated to lower the operative temperature of the hopper wall which is typically of hot rolled steel plate and further conserve and retain the sensible heat in the insulating medium. A heat shield 86 can be used to protect the operators from radiant heat while unloading the column.

Figure 6:
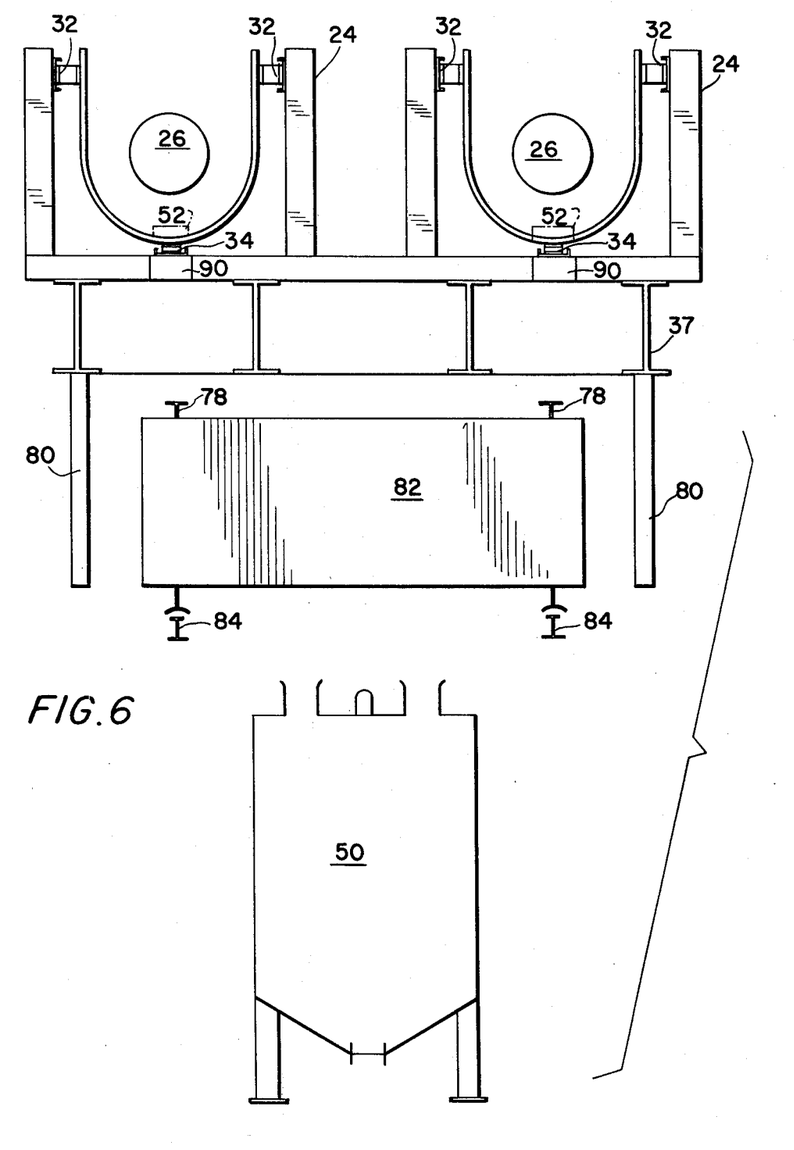

FIG. 6 is a cross-sectional view of the LWG furnace with transporter car 82 in place over hopper 50. Hydraulic jacks 78 lift the furnace support structure 37 from piers 80 for transport to the next working station. Transporter car 82 runs on the same rails as chute car 44 (not shown).

Figure 7:
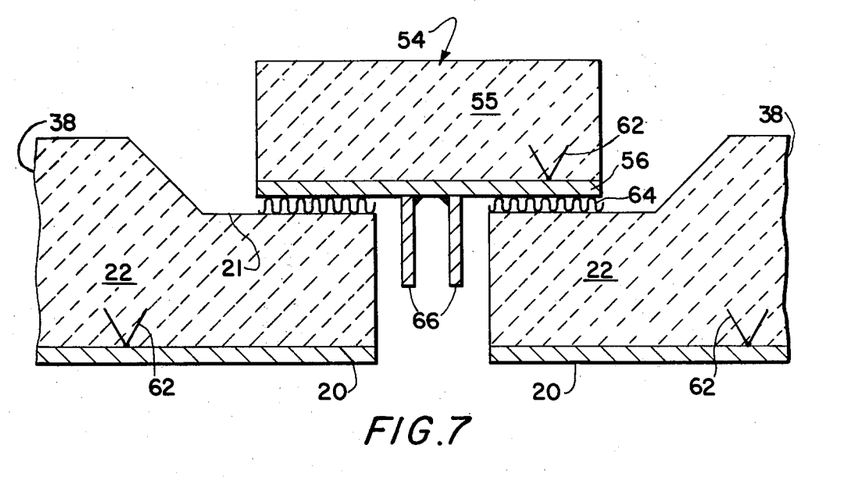

FIG. 7 shows the expansion joint arrangement which provides a tight seal between adjacent shell assemblies 38 to contain the particulate insulation medium while accomodating differential thermal expansion between adjacent shell sections 20. Shell 20 has a contoured nest 21 in the refractory liner 22, a U-shaped insert assembly 54 comprising refractory 55, preferably the same castable refractory used for liner 22, anchors 62, and a flexible ceramic fiber gasket 64 such as materials known as Fiberfrax®, Kaowool®, or similar alumina-silica fibers. Stiffeners 66 strengthen the steel liner 56. This structure allows for thermal expansion of the shell segments relative to each other while maintaining a tight mechanical seal and electrical isolation between shell assemblies 38.

Figures 8, 9:
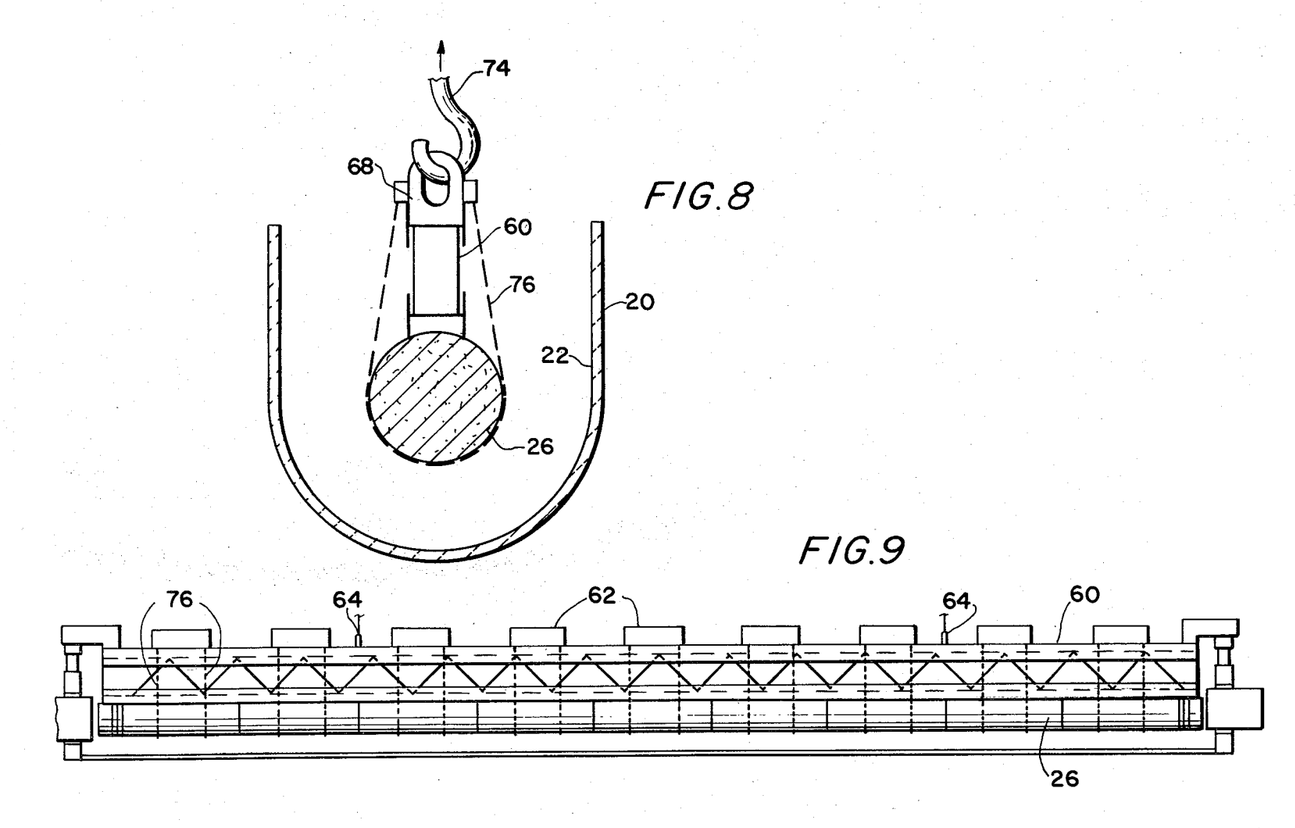

FIG. 8 is a cross-section of a furnace shell 20, electrode column 26, column loading truss 60, crane attachment 68, crane hook 74, and one or more chain slings 76 holding each electrode.

FIG. 9 is a longitudinal cross-section of the furnace with column loading truss 60 holding the electrode column 26 by chain slings 76 in place for the column loading operation.

Figure 10:
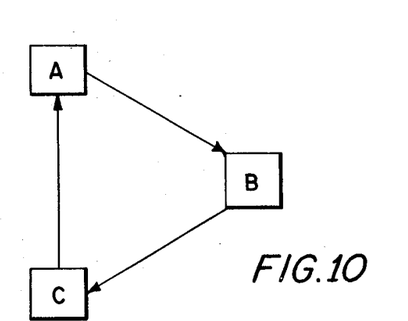

FIG. 10 is a flow sheet showing the transfer of the furnace from firing station A to cooling area B, dump and re-load station C and back to firing station A.

Figure 11:
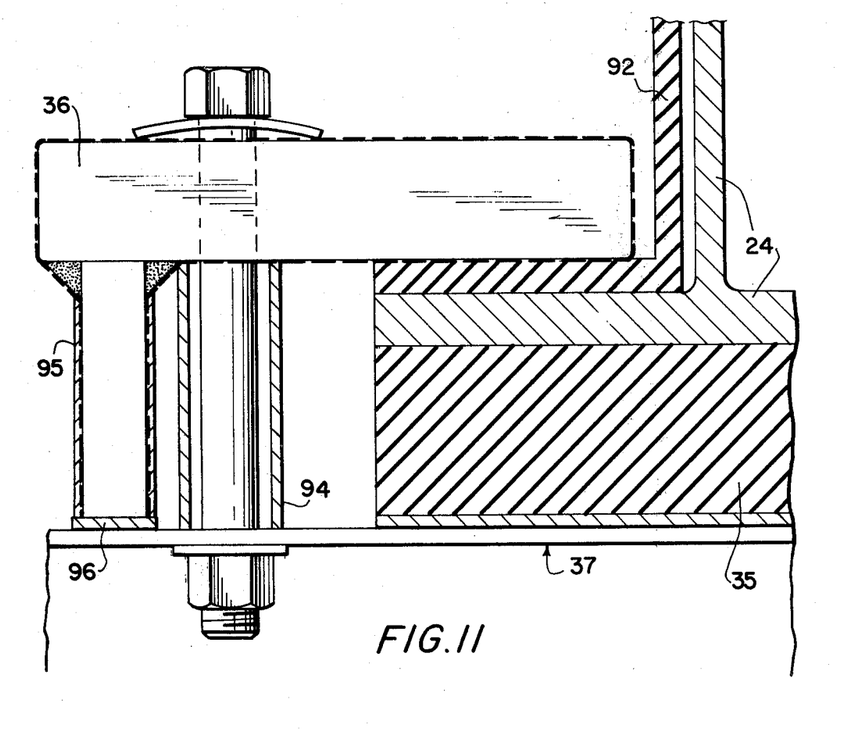

FIG. 11 illustrates the components to support, anchor and electrically isolate the shell support frame 24 from the furnace subframe 37. Insulation pad 35 carries the weight of the furnace while anchoring bracket 36 holds the support frame 24 in place through pressure applied to top insulator 92. Bushings 94 and coating 95 provide additional dielectric protection against shorting which may be caused by dust build-up.

I claim:

1. An apparatus for the production of graphite from carbon bodies comprising a refractory lined open-topped metal and generally U-shaped shell furnace supported by structural support means, a column of carbon bodies within said furnace which are in end abutting relationship surrounded by particulate thermal insulation medium and held in place by and in electrical contact with two electrical power heads located at the ends of said furnace at least one of which is movable by means effective to apply pressure to said column, said power heads being adapted to conduct a current of electricity through said column of bodies to convert the carbon bodies to graphite by the Joule effect, and means to remove said thermal insulation medium by gravity dumping through the bottom of said furnace.

2. The apparatus of claim 1 wherein the means for dumping the insulation medium comprise valve means connecting with duct means leading to at least one hopper situated below the furnace.

3. The apparatus of claim 1 wherein conveying means are provided effective to move the furnace and structural support means therefor from a firing station to at least one other process station, and thence back to said firing station.

4. The apparatus of claim 1 wherein chute means are provided effective to connect the dumping means of the furnace with one or more hoppers.

5. The apparatus of claim 1 wherein the metal furnace comprises a plurality of shell assemblies, each of which is electrically isolated from each other and from ground.

6. The apparatus of claim 5 wherein each shell assembly is isolated from another adjacent shell assembly by a gap across which an insulating seal arrangement comprising a refractory lined metal member conforming in shape to the interior of the segment is installed provided with a flexible ceramic fiber seal gasket on the exterior of said member, the whole effective to maintain a sealing action against loss of particulate insulation and to act as an electrical isolator between said assemblies, while providing for relative movement between said adjacent segments.

7. The apparatus of claim 5 wherein each shell assembly is supported by flexible support means effective to allow relative differential thermal expansion and thermal movement of said assembly with respect to structural support frame.

8. The apparatus of claim 5 wherein each shell assembly is supported by flexible web support means effective to allow relative differential thermal expansion and thermal movement of said segment with respect to structural support frame comprising a plurality of I-beams placed vertically, one flange attached to said shell assembly and one flange attached to said structural support frame, the web flexing to allow said thermal movement.

9. The apparatus of claim 5 wherein each shell assembly is supported at its base by slidable support means effective to allow differential thermal expansion of said shell with respect to the structural support frame.

10. The apparatus of claim 1 wherein the particulate thermal insulation medium is a calcined petroleum coke recovered from the settling chamber in a rotary kiln installation and having a particle size range such that the particles pass a screen having 3.9 mesh/cm and are retained on a screen having 39 mesh/cm.

11. The apparatus of claim 1 wherein the metal furnace is lined with a high alumina castable refractory.

12. The apparatus of claim 1 wherein one or both electrical power heads are movable and pressurized by hydraulic cylinder means.

13. The apparatus of claim 1 wherein the gravity dumping means comprise a plurality of dump ports and gate valves in the bottom of the furnace.

14. The apparatus of claim 1 wherein the furnace is equipped to be reloaded with particulate insulation from an overhead hopper to place said insulation medium on both sides of the column of carbon bodies.

15. An apparatus for the production of carbon bodies from baked cylindrical carbon bodies comprising an open-topped metal shell furnace having an approximately U-shaped cross-section and closed ends, mounted on structural support means, and lined with a cast-in-place refractory compound held in place by anchors, said furnace comprising a plurality of shell assemblies electrically isolated from each other by a gap sealed against loss of particulate insulation contained therein by a metal insert and gasket conforming to the shape of the interior of said assemblies and on its interior by said cast-in-place refractory compound, said assemblies being isolated from ground by means of insulation pads and anchoring brackets between said support means and ground, said structural support means comprising a metal support structure, said furnace being specially adapted to hold and maintain a series of said carbon bodies in aligned horizontal end-abutting relationship by hydrostatic pressure applied from movable power heads placed at each end of the furnace, to convert said bodies to graphite by the Joule effect with application of electrical current through said power heads, said bodies being held in position by placement within a bed of said particulate insulation medium within said furnace, said furnace and said support means being movable, means effective to connect said furnace power heads to a current source, means to transport said furnace and said structural support means to a plurality of working stations including a firing station, a cooling station and a dump and re-load station, means on said support means to maintain hydrostatic pressure while moving said furnace, gravity dumping means on said furnace comprising a plurality of dump ports and valves situated at the bottom and adapted to dump said insulation medium through chute means movable under said furnace, a plurality of receiving hoppers situated under said furnace to receive said insulation medium at said dump and re-load station, said hoppers adapted to be moved to a storage area and back to the said dump and re-load station, chute means connectible to said hoppers in the shape of an inverted Y, said chute means especially adapted to re-load said furnace with said insulation medium by traversing said furnace longitudinally while discharging said medium on each side of said carbon bodies, and insulation compactor means comprising a vibrator.

16. A process for operating a furnace for converting amorphous carbon bodies to graphite wherein said bodies are held firmly in end-abutting relationship forming a horizontal column and while held in a bed of particulate insulation medium in a metal shell furnace by two electrical power heads at least one of which is movable and effective to apply hydrostatic pressure to said column while simultaneously conducting a current of electricity through said column until it reaches a peak temperature from 2500° to 3000° C., and cooling the column to 1500° to 1700° C. before removal of stock, and gravity dumping said insulation medium at the end of each operating cycle through the bottom of said furnace.

17. The process of claim 16 wherein the furnace is moved during the operating cycle from a firing station at which the carbon bodies are converted to graphite to a cooling station where said furnace is allowed to cool, said bodies cooling to approximately 1500° to 1700° C., then to a dump and re-load station at which the said bodies are removed from the furnace, the insulation medium is dumped into hoppers by gravity, the furnace is re-loaded with a new charge of said insulation medium and a new load of said carbon bodies, then moved to a firing station.

18. The process of claim 16 wherein the hot insulation medium when dumped, is at a weighted average temperature of from 700° C. to 1100° C., dumped by gravity from the furnace into at least one hopper, said hopper transferred to a position above said furnace and said medium reloaded into said furnace by gravity.

19. The process of claim 16 wherein the hot insulation medium is dumped at a weighted average temperature of from 700° C. to 1100° C., by gravity from a first furnace into at least one hopper, the furnace removed, said hopper moved to a storage area, then back to the dump and re-load station at which said insulation medium is recharged into a second said furnace.

20. The process of claim 16 wherein the hot insulation medium is dumped at a weighted average temperature of from 700° to 1100° C., by gravity from the furnace into one or more hoppers, then said hopper is removed from beneath said furnace to a position above said furnace, and said medium is used to reload said furnace with said medium for the next operating cycle of graphitization.

21. The process of claim 16 wherein the furnace is stationary, the insulation medium being dumped into at least one hopper beneath the furnace, said hopper being then removed to a position above said furnace and said insulation medium then recharged into said furnace.

22. An apparatus for the production of graphite from carbon bodies comprising a plurality of refractory lined open-topped metal and generally U-shaped shell furnace segments supported by structural support means, a column of carbon bodies within said furnace which are in end abutting relationship surrounded by particulate thermal insulation medium and held in place by, and in electrical contact with two electrical power heads located at the ends of said furnace at least one of which is movable by means effective to apply pressure to said column, said power heads being adapted to conduct a current of electricity through said column of bodies to convert the carbon bodies to graphite by the Joule effect, each of said shell segments being electrically isolated from each other and from ground.

23. An apparatus for the production of graphite from carbon bodies comprising a refractory lined open-topped metal and generally U-shaped shell furnace supported by structural support means, a column of carbon bodies within said furnace which are in end abutting relationship surrounded by particulate thermal insulation medium and in electrical contact with two electrical power heads located at the ends of said furnace at least one of which is movable by means effective to apply pressure to said column, said power heads being adapted to conduct a current of electricity through said column of bodies to convert the carbon bodies to graphite by the Joule effect, wherein the metal furnace comprises a plurality of shell segments, each of said segments being electrically isolated from each other and from ground, and wherein each shell segment is isolated from another adjacent shell segment by a gap across which an insulating seal arrangement comprising a refractory lined metal member conforming in shape to the interior of the segment is installed and provided with a flexible ceramic fiber seal gasket on the exterior of said member, the whole effective to maintain a sealing action against loss of particulate insulation and to act as an electrical isolator between said segments, while providing for relative movement between said adjacent shell segments.

* * * * *